United States Patent
Lee

(10) Patent No.: US 7,669,492 B2
(45) Date of Patent: Mar. 2, 2010

(54) ROTATION GENERATING APPARATUS

(76) Inventor: Dug Gum Lee, 3160 W. 5th St., #109, Los Angeles, CA (US) 90020

( * ) Notice: Subject to any disclaimer, the term of this patent is extended or adjusted under 35 U.S.C. 154(b) by 373 days.

(21) Appl. No.: 11/973,135

(22) Filed: Oct. 6, 2007

(65) Prior Publication Data

US 2009/0090202 A1    Apr. 9, 2009

(51) Int. Cl.
*F16H 21/16* (2006.01)
(52) U.S. Cl. .................. 74/25; 74/36; 74/28; 74/42
(58) Field of Classification Search ............. 74/25, 74/28, 36, 42, 60
See application file for complete search history.

(56) References Cited

U.S. PATENT DOCUMENTS

| | | | | |
|---|---|---|---|---|
| 2,167,314 A | * | 7/1939 | Sarkar | 74/36 |
| 3,034,362 A | * | 5/1962 | Caddell | 74/36 |
| 3,139,761 A | * | 7/1964 | Gindroz, Jr. | 74/68 |
| 3,867,848 A | * | 2/1975 | Munzinger | 74/70 |

* cited by examiner

*Primary Examiner*—David M Fenstermacher

(57) ABSTRACT

A rotational movement generating apparatus having a platform supported by a support assembly. The support assembly connects to a central point of the platform in a manner that allows the platform to rotate at the central point. A central axis is defined with the circular rotation of the platform. The platform defines a first radius line extending from the central point to an outer edge of the platform. An arm connects to the platform at a connection point that is spaced apart from the first radius line of the platform. A first portion of the arm ends at an elbow where it connects to a second portion of the arm. The second portion of the arm is positioned to extend in an upward direction over the first radius line at a predetermined angle towards the central axis. A thrust bearing is positioned above the platform in alignment with the central point. The thrust bearing has an outer disk rotatably encircling a thrust cylinder. The second portion of the arm connects to the outer disk. The thrust bearing is positioned so that when the thrust cylinder is pulled with a predetermined force away from the platform along the central axis, the platform rotates.

19 Claims, 2 Drawing Sheets

ROTATION GENERATING APPARATUS

BACKGROUND OF THE INVENTION

1. Field of the Invention

This invention generally relates to a rotating apparatus for use with other rotation devices. More particularly the apparatus of the present invention relates to an apparatus which generates a rotational movement that can be used to provide rotational movement to other rotating devices including windmills, wheels, propellers, axle of wheels, and gears.

2. Description of the Prior Art

There are many different types of rotating devices. Examples of rotating devices include windmills, wheels, propellers, axle for wheels, motor gears, and so on. For windmills, the power to turn the blades of the windmill comes from wind hitting the blades at the proper angle. The wind must continually blow onto the blades to continue the rotation of the blades. For wheels, examples include from bicycle wheels, motorcycle wheels, to ferris wheels. For bicycles, power for rotation of the wheels derives from manual leg power pushing the pedals, and for motorcycles and ferris wheels, power for rotation comes from battery, combustion, or electric powered motors.

For generating rotational force for rotating devices, power must come from sources such as manual, leg powered, battery, electric, wind, solar, combustible material, and so on. It is desirable that the least amount of power from the power source be used for generation of the rotation of the rotating device. There are known ways to lower the amount of power utilized from the power source, which can include modification of the design of the rotating device, varying the weight of the rotating devices, and varying the structure of the rotating device. In a U.S. Pat. No. 3,885,814 issued to Rizzo, a bicycle is taught having a wheel specially weighted with weights which are slidably attached to the spokes of the wheel and are spring biased to move between an extended and a retracted position depending on the rate of rotation of the wheel. These weights are placed on the wheel to afford enhanced momentum, stability, and reduce human pedal power for continual rotation at high rates of speed.

None of the prior art teaches an apparatus as taught by the present invention. The apparatus of the present invention generates rotational force utilizing a constant eccentric force pulling an upwardly inclined arm. The arm is positioned so that the application of an upward pull thereon creates an eccentric force pulling the arm. The apparatus of the present invention can be used to generate a constant rotating motion using the eccentric pulling force on the arm. The apparatus can be coupled with rotating devices to reduce the power necessary to rotate the rotating portions of these rotating devices.

Thus, it is an object of the present invention to provide an apparatus which generates a constant rotational force with the application of a constant pulling force. It is another object of the present invention to provide an apparatus which provides rotational force to the rotating portions of other rotating devices. It is yet another object of the present invention to reduce the usage of power necessary to rotate devices.

SUMMARY OF THE INVENTION

The present invention is an apparatus for generating a rotational movement using the application of an eccentric force. This apparatus can be used with other devices to provide rotational force to the rotating component of the other devices. The present invention has a platform supported by a support structure. A rod extends from a central point of the platform and through an aperture of the support structure. The platform is formed to rotate at the central point in a circular motion. A layer of bearing can be placed between the rod and the support structure so that the platform can rotate relative to the support structure. A central axis is defined with the circular rotation of the platform at the central point; the central axis extends through the central point and is the axis about which the platform rotates. The platform defines a first radius line extending from the central point to an outer edge of the platform.

A rotational assembly connects to the platform to generate a rotation of the platform. The rotational assembly includes an arm and a thrust bearing. The arm has a first portion attached to the platform at a predetermined attachment point which is spaced apart from the first radius line of the platform. The first portion of the arm ends at an elbow where it connects to a second portion of the arm. The second portion of the arm is positioned to extend in an upward direction over the first radius line at a predetermined angle pointing towards the central axis. The thrust bearing has a center and is positioned above the platform in a manner so that the center of the thrust bearing is in alignment with the central point of the platform. The thrust bearing has an outer disk encircling a thrust cylinder in a manner which allows the outer disk to rotate. A layer of bearing can be placed between the thrust cylinder and the outer disk to allow for a smooth rotation of the outer disk relative to the thrust cylinder. The second portion of the arm connects to the outer disk. The thrust bearing is positioned so that when the thrust cylinder is pulled with a predetermined force away from the platform in the upward direction along the central axis, the platform rotates together with the outer disk of the thrust bearing. For optimal continuous rotation of the platform, when the thrust cylinder is being pulled continuously, the predetermined angle of the second portion of the arm should be in the range of forty to fifty degrees. The second portion of the arm connects to the elbow of the first portion in a manner that allows the second portion to pivot within a predetermined range. Also, the second portion of the arm connects to the outer disk of the thrust bearing in a manner that allows the second portion to pivot within a predetermined range at the connection with the outer disk.

In use, the constant application of a predetermined force pulling the thrust bearing away from the platform will cause the platform to continuously rotate. The present invention can be coupled with most devices, which have a rotational movement for providing rotational force to the rotating component.

DETAILED DESCRIPTION OF AN EMBODIMENT

Figure 1:
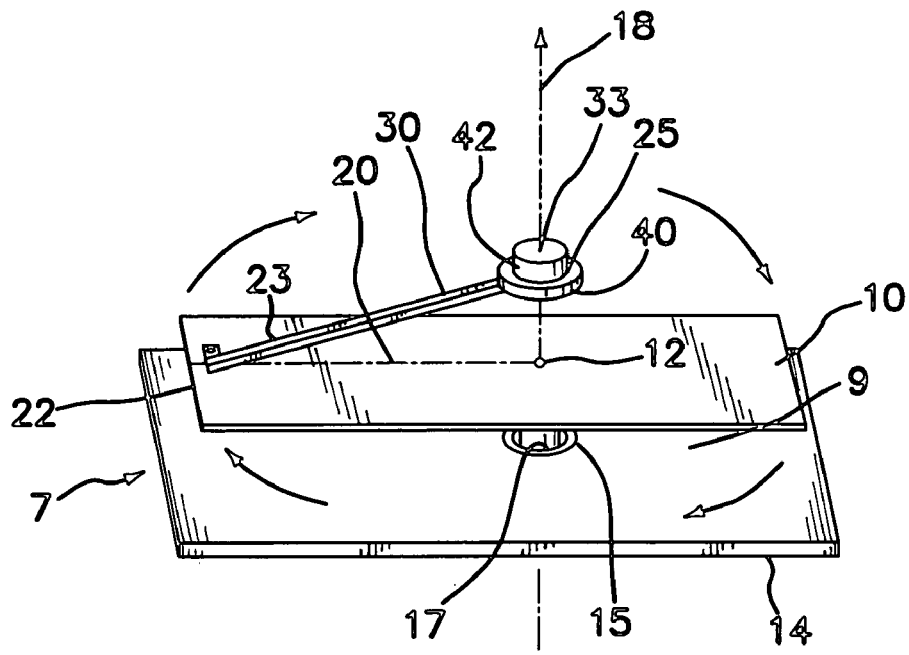
FIG. 1 is a top perspective view of the present invention.

The present invention illustrated in FIGS. 1 to 4 is an apparatus 7 which utilizes the application of a continuous eccentric force to generate a continuous rotating motion. Such rotating motion can be coupled with other devices to provide continuous rotational force to the rotating component of other devices. The apparatus comprises a platform 10 having a central point 12 at which the platform is formed to rotate in a circular motion. A support assembly 9 connects to the platform in a manner that allows the platform 10 to rotate. In the embodiment shown, the support assembly is a support structure 14 having a connection to the platform in the form of a rod 16. The support structure 14 is positioned below the platform 10 and has an aperture 15 extending therethrough. The rod 16 is attached so that it extends downward from the central point 12 of the platform 10 and through the aperture 15 of the support structure 14. A layer of bearing 17 can be placed between the rod 16 and the support structure 14 so that the platform 10 can rotate smoothly relative to the support structure 14. In the embodiment shown, the layer of bearing 17 is shown in the aperture 15 of the support structure 14. With the circular rotation of the platform 10 at the central point 12, a central axis 18 is defined extending through the central point 12 and about which the platform 10 rotates. The platform defines a first radius line 20 extending from the central point 12 to an outer edge 22 of the platform.

Figure 2:
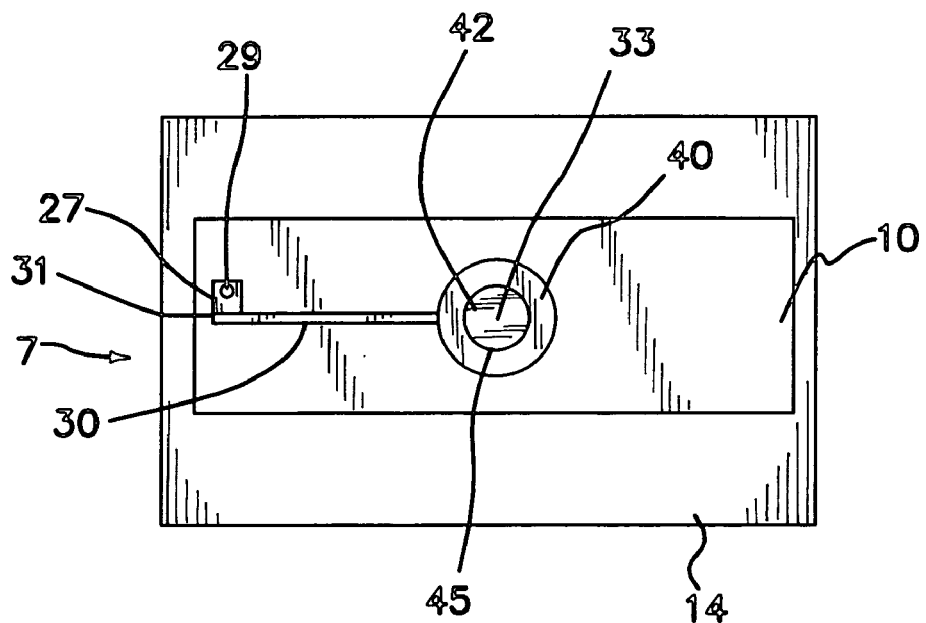
FIG. 2 is a top plan view of the present invention.
Figure 3:
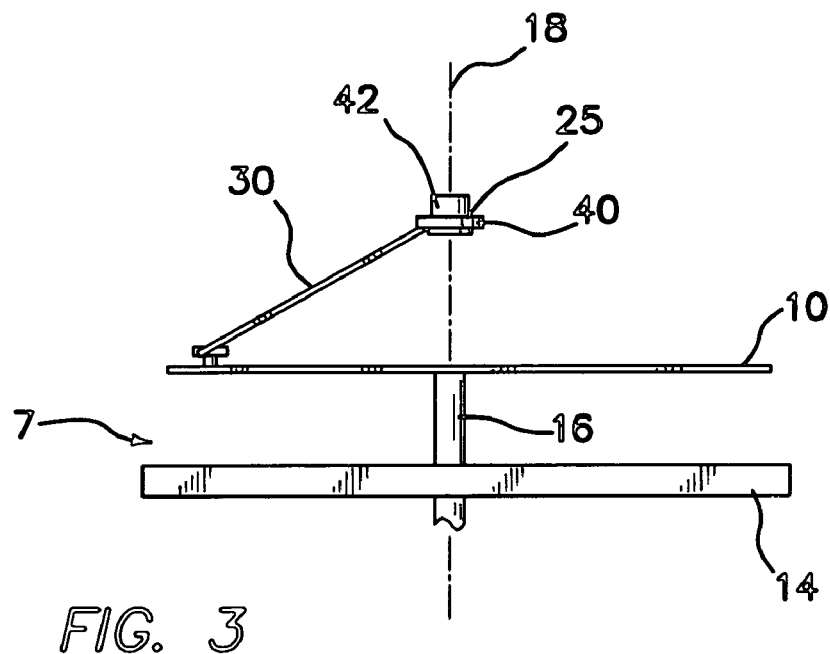
FIG. 3 is a side view of the present invention.

A rotational assembly connects to the platform 10 to generate a rotation of the platform. The rotational assembly includes an arm 23 and a thrust bearing 25. The arm 23 has a first portion 27 attached to the platform 10 at a predetermined connection point 29, which is spaced apart from the first radius line 20 of the platform 10. The first portion 27 of the arm 23 ends at an elbow 31 where it connects to a second portion 30 of the arm 23. As shown in the illustrations, the second portion 30 of the arm 23 is positioned to overlap the first radius line 20 and extend upwards at a predetermined angle pointing towards the central axis 18. The second portion 30 of the arm 23 overlaps the first radius line 20 in a manner so that in a top plan view as shown in FIG. 2, the second portion 30 of the arm 23 aligns over and essentially covers the first radius line 20. The thrust bearing 25 has a center 33 and is positioned above the platform 10 in a manner so that the center 33 of the thrust bearing 25 is in direct alignment with the central point 12 of the platform 10. The thrust bearing 25 as shown in the illustrations has an outer disk 40 encircling a thrust cylinder 42 in a manner which allows the outer disk 40 to rotate around the thrust cylinder 42. A layer of bearing 45 can be placed between the thrust cylinder 42 and the outer disk 40 to allow for a smooth rotation of the outer disk 40 relative to the thrust cylinder 42. The second portion 30 of the arm 23 connects to the outer disk 40. The thrust bearing 25 is positioned so that when the thrust cylinder 42 is pulled continuously with a predetermined force away from the platform in the upward direction along the central axis 18, the platform 10 rotates continuously together with the outer disk 40 of the thrust bearing 25. For optimal rotation of the platform 10, when the thrust cylinder 42 is pulled, the predetermined angle of the second portion 30 of the arm 23 should be maintained at an angle in the range of forty to fifty degrees. In the preferred embodiment, the predetermined angle is maintained at an angle of forty five degrees as the thrust cylinder 42 is being pulled continuously. The second portion 30 of the arm 23 is connected to the elbow 29 of the first portion 27 in a manner that allows the second portion 30 to pivot within a predetermined range. Also, the second portion 30 of the arm 23 is connected to the outer disk 40 of the thrust bearing 25 in a manner that allow the second portion 30 to pivot within a predetermined range at the connection with the outer disk 40.

The illustrations show an embodiment of the platform 10 in a rectangular shape; however, the shape of the platform 10 is not a limiting feature and can be in other shapes. Due to the formation and position of the arm, the predetermined force pulling the thrust bearing 25 pulls the arm 23 with an eccentric force between the arm 23 and the central point 12 thereby causing the platform to rotate in a circular motion at the central point 12.

In use, the constant application of a predetermined force pulling the thrust bearing 25 away from the platform 10 will cause the platform 10 to continuously rotate. The source of the predetermined force pulling the thrust bearing 25 is not a limiting factor. There are many sources of such a pulling force known in the art, including but not limited to elastic bands, springs, manual force, and tension bars.

Figure 4:
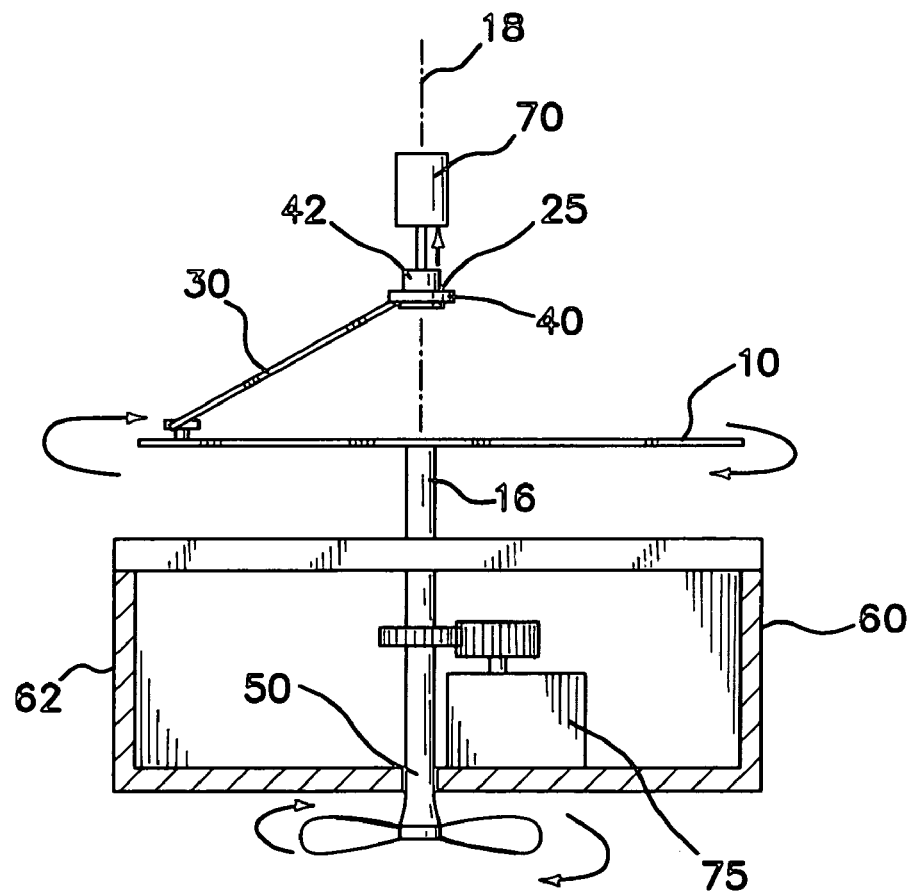
FIG. 4 is a side view of the present invention shown operatively connected to another device having a rotating component.

The present invention can be coupled with most devices, which have a rotational movement for providing rotational force to the rotating component of the devices. Although only one simple illustration is shown herein, the apparatus can be coupled to the rotating blade of a windmill and countless number of other rotating devices in order to provide rotational force for the rotating movement. For instance, other rotating devices can include, wheels, mills, propellers, mills, gears, and others. It is well-known in the art numerous ways to operatively couple the rotational force of the present invention when the platform 10 rotates with the application of the pulling force on the thrust bearing 25 to the rotating component of the other devices to provide rotational force thereto. For instance, the rod 16 can be directly or indirectly connected to the wheel or gear of another device. The support assembly 9 shown in the illustrations serves as a support for the platform 10. The support assembly 9 can be part of a housing (not shown) or structural component (not shown) for the present invention. When the present invention is coupled with another device, the housing or structural component of the other device can be made to serve as a support structure 14 as shown in FIG. 4. Although the embodiment shown in the illustrations show one arm 23 attached to the thrust bearing, multiple arms (not shown) can be attached in a substantially identical manner to the thrust bearing and platform to further enhance the rotation of the platform with the application of pulling force on the thrust bearing 25. When two arms 23 are used, they should not be placed on opposed sides of the platform 10. When three or more arms 23 are used, they should not be placed equidistant relative to each other on the platform 10.

Although an embodiment of the support assembly 9 is shown in the illustrations having a support structure 14 and rod 16, there can be numerous variations of the support assembly 9. The essential scope of the support assembly 9 is to provide a structural support to the platform and permit the platform 10 to rotate at the central point 12 with the application of the pulling force on the thrust bearing 25. As such, in another embodiment (not shown), the support assembly can consist of a support structure having a connecting member extending therefrom and connecting to the central point of the platform in a manner that permits the rotation of the platform at the connection between the connecting member and the platform.

FIG. 4 shows the present invention coupled with a rotating component 50 of a device 60. The present invention improves a device having a rotating component by adding a novel method of providing rotational force to the rotating component. The method involves providing an apparatus 7 of the present invention as described herein and operatively connecting the rod 16 to the rotating component of the device. Applying a predetermined amount of continuous pulling force on the thrust bearing away from the platform along the central axis will cause a continuous rotation of the platform and rod, thereby providing rotational force to the rotating component. The pulling force on the thrust bearing 25 must be provided to the apparatus 7 to generate the rotation of the platform 10, and the pulling force must be continually provided to cause a continuous rotation of the platform 10. As discussed earlier, the pulling force can be provided through numerous existing sources ranging from manpower to springs to machines and others. For purposes of illustration, a simple device 60 and configuration is shown in FIG. 4. The device 60 is a basic illustration and has a housing 62, and part of the housing is shown cut in a cross-sectional view to show the interior of the housing. The rod 16 of the apparatus 7 is operatively connected to the rotating component 50, which in the illustration is a propeller. The support structure for the apparatus 7 is provided by part of the housing 62 of the device 60. Rotational force to the propeller is provided by the rotation of the platform 10 as a pulling force from a source of power 70 pulls the thrust bearing 25 away from the platform 10 along the central axis 18. The apparatus 7 alone can provide rotational force to the propeller or act in conjunction with an existing rotation generating source 75 that is already known in the art.

Although an embodiment of the invention has been described and illustrated for purposes of clarity and example, it should be understood that many changes, substitutions and modifications to the described embodiment will be apparent to those having skill in the art in light of the foregoing disclosure without departing from the scope and spirit of the present invention which is defined by the claims which follow.

What is claimed as being new and therefore desired to be protected by Letters Patent of the United States is as follows:

1. A rotational movement apparatus comprising:
   a platform, said platform having a central point at which said platform rotates, said platform having an outer edge;
   said central point defining a central axis extending therethrough about which said platform rotates;
   said platform defining a first radius line extending from the central point to the outer edge;
   a rod connected to said platform and extending downward from the central point;
   an arm connected to the platform at a connection point spaced apart from the first radius line;
   said arm having a first portion extending from the connection point with said platform;
   said first portion of said arm ending at an elbow where said first portion of said arm connects to a second portion of said arm;
   said second portion of said arm is positioned to overlap the first radius line and extend upwards from the platform at a predetermined angle towards the central axis;
   a thrust bearing positioned above the platform in a manner so that a center of the thrust bearing is in alignment with the central point of the platform,
   said thrust bearing connected to said second portion of said arm; and,
   wherein said thrust bearing is positioned so that when a predetermined force pulls the thrust bearing upward along the central axis, the thrust bearing pulls the arm causing the platform to rotate.

2. The apparatus as described in claim 1 wherein:
   said thrust bearing comprises an outer disk encircling a thrust cylinder, said outer disk formed to rotate around said thrust cylinder;
   said second portion of said arm connects to said outer disk; and,
   said thrust bearing is positioned so that when a predetermined force pulls the thrust cylinder upward along the central axis, the thrust bearing pulls the arm causing the platform to rotate.

3. The apparatus as described in claim 1 wherein the predetermined angle at which the second portion of the arm extends upwards towards the central axis is in the range of forty to fifty degrees.

4. The apparatus as described in claim 1 wherein the predetermined angle at which the second portion of the arm extends upwards towards the central axis is forty five degrees.

5. The apparatus as described in claim 1 wherein:
   said second portion of the arm is connected to the elbow of the first portion in a manner that allows the second portion to pivot within a predetermined range; and,
   said second portion of the arm is connected to the thrust bearing in a manner that allows the second portion to pivot within a predetermined range.

6. The apparatus as described in claim 2 wherein:
   said second portion of the arm is connected to the elbow of the first portion in a manner that allows the second portion to pivot within a predetermined range; and,
   said second portion of the arm is connected to the outer disk of the thrust bearing in a manner that allows the second portion to pivot within a predetermined range.

7. A rotational movement apparatus comprising:
   a platform, said platform having a central point at which said platform rotates, said platform having an outer edge;
   said central point defining a central axis extending therethrough about which said platform rotates;
   said platform defining a first radius line extending from the central point to the outer edge;
   a support assembly disposed below said platform;
   said support assembly having a connection to the platform at the central point in a manner that allows the platform to rotate at the central point;
   an arm connected to the platform at a connection point spaced apart from the first radius line;
   said arm having a first portion extending from the connection point with said platform;
   said first portion of said arm ending at an elbow where said first portion of said arm connects to a second portion of said arm;
   said second portion of said arm is positioned to overlap the first radius line and extend upwards from the platform at a predetermined angle towards the central axis;
   a thrust bearing positioned above the platform in a manner so that a center of the thrust bearing is in alignment with the central point of the platform,
   said thrust bearing connected to said second portion of said arm; and,
   wherein said thrust bearing is positioned so that when a predetermined force pulls the thrust bearing upward along the central axis, the thrust bearing pulls the arm causing the platform to rotate.

8. The apparatus as described in claim 7 wherein;
   the support assembly comprises:
   a support structure disposed below said platform, said support structure having an aperture;
   a rod disposed through the aperture of the support structure and serving as said connection to the central point of the platform; and,
   said rod disposed in a manner through the aperture that permits the rotation of both the platform and rod relative to the support structure.

9. The apparatus as described in claim 7 wherein:
said thrust bearing comprises an outer disk encircling a thrust cylinder, said outer disk formed to rotate around said thrust cylinder;
said second portion of said arm connects to said outer disk; and,
said thrust bearing is positioned so that when a predetermined force pulls the thrust cylinder upward along the central axis, the thrust bearing pulls the arm causing the platform to rotate.

10. The apparatus as described in claim 7 wherein the predetermined angle at which the second portion of the arm extends upwards towards the central axis is in the range of forty to fifty degrees.

11. The apparatus as described in claim 7 wherein the predetermined angle at which the second portion of the arm extends upwards towards the central axis is forty five degrees.

12. The apparatus as described in claim 7 wherein:
said second portion of the arm is connected to the elbow of the first portion in a manner that allows the second portion to pivot within a predetermined range; and,
said second portion of the arm is connected to the thrust bearing in a manner that allows the second portion to pivot within a predetermined range.

13. The apparatus as described in claim 9 wherein:
said second portion of the arm is connected to the elbow of the first portion in a manner that allows the second portion to pivot within a predetermined range; and,
said second portion of the arm is connected to the outer disk of the thrust bearing in a manner that allows the second portion to pivot within a predetermined range.

14. In a device having a rotating component, with the improvement comprising a method of providing rotational force to said rotating component, said method comprising the steps of:
providing a rotational movement apparatus comprising:
a platform, said platform having a central point at which said platform rotates, said platform having an outer edge;
said central point defining a central axis extending therethrough about which said platform rotates;
said platform defining a first radius line extending from the central point to the outer edge;
a rod connected to said platform and extending downward from the central point;
an arm connected to the platform at a connection point spaced apart from the first radius line;
said arm having a first portion extending from the connection point with said platform;
said first portion of said arm ending at an elbow where said first portion of said arm connects to a second portion of said arm;
said second portion of said arm is positioned to overlap the first radius line and extend upwards from the platform at a predetermined angle towards the central axis;
a thrust bearing positioned above the platform in a manner so that a center of the thrust bearing is in alignment with the central point of the platform,
said thrust bearing connected to said second portion of said arm; and,
wherein said thrust bearing is positioned so that when a predetermined force pulls the thrust bearing upward along the central axis, the thrust bearing pulls the arm causing the platform to rotate;
operatively connecting the rod to the rotating component of the device; and,
applying a predetermined amount of pulling force on the thrust bearing in a direction away from the platform along the central axis to cause a rotation of the platform and the rod.

15. The method as described in claim 14 wherein:
said thrust bearing comprises:
an outer disk encircling a thrust cylinder;
a layer of bearing disposed between the thrust cylinder and outer disk so that said outer disk rotates around said thrust cylinder;
said second portion of said arm connects to said outer disk; and,
wherein said thrust bearing is positioned so that when a predetermined force pulls the thrust cylinder upward along the central axis, the thrust bearing pulls the arm causing the platform to rotate.

16. The method as described in claim 14 wherein the predetermined angle at which the second portion of the arm extends upwards towards the central axis is in the range of forty to fifty degrees.

17. The method as described in claim 14 wherein the predetermined angle at which the second portion of the arm extends upwards towards the central axis is forty five degrees.

18. The method as described in claim 14 wherein:
said second portion of the arm is connected to the elbow of the first portion in a manner that allows the second portion to pivot within a predetermined range; and,
said second portion of the arm is connected to the thrust bearing in a manner that allows the second portion to pivot within a predetermined range.

19. The method as described in claim 15 wherein:
said second portion of the arm is connected to the elbow of the first portion in a manner that allows the second portion to pivot within a predetermined range; and,
said second portion of the arm is connected to the outer disk of the thrust bearing in a manner that allows the second portion to pivot within a predetermined range.

* * * * *